United States Patent Office.

HARRISON B. MEECH, OF FORT EDWARD, NEW YORK.

Letters Patent No. 61,848, dated February 5, 1867.

PROCESS OF TREATING STRAW AND OTHER MATERIALS FOR THE MANUFACTURE OF PAPER PULP.

*The Schedule referred to in these Letters Patent and making part of the same.*

TO ALL WHOM IT MAY CONCERN:

Be it known that I, HARRISON B. MEECH, of Fort Edward, Washington county, and State of New York, have invented a new and improved Process for Treating Straw and other Fibrous Substances in converting the same to Pulp for the Manufacture of White Paper; and I hereby declare the following to be a full and exact description of the same.

My process consists in the preparation of an improved boiling-liquor, and the manner of applying the same to the stock to be treated, so as to accomplish the desired result with the least possible expense of time and money.

My improved boiling-liquor consists of soda ash, lime, common salt, sulphuric acid, and water, prepared as follows:

To treat two thousand pounds of straw or other fibrous substances, I take two hundred and seventy-five pounds of merchantable soda ash, two hundred pounds of quick-lime, and fifteen hundred gallons of water, and mix them thoroughly together. To this solution I add fifty pounds of common salt, and, when dissolved by the liquid, I add ten pounds of sulphuric acid or chlorine. I prepare the straw or other fibrous material by cutting the same into short lengths, and pack the same closely into the boiler. I prefer a rotary boiler. I soak the same in warm or hot water for some time, or until the stock is thoroughly saturated and softened. I then, by means of tubes or pipes, draw off the water, and, by means of an air-pump exhaust the air in the boiler, thus producing a vacuum, for the purpose of producing a breaking up of the stock by the distension of the air or gases contained in the cells of the stock. While the stock is thus distended and broken by the expansion of the air or gases in the cells of the stock, I then introduce the liquor, prepared as aforesaid, and continue to force in the liquor or water or air until an internal pressure is obtained from forty to one hundred pounds to the square inch. When this process of charging the boiler is completed, I then close it air-tight, and proceed to boil the stock for about four hours. I find it useful to first charge the boiler with the requisite quantity of straw, duly prepared as above described, and then, after soaking it in warm water for a short time, and drawing off the water and producing the vacuum, as above set forth, to introduce the solution of soda ash and lime and common salt, in the proportions above described; after which, to introduce into the boiler the ten pounds of sulphuric acid, diluted in about two hundred gallons of water, and then produce the pressure, (either hydrostatic or pneumatic,) as above described. The benefit of the last method of producing the mixture in the boiler is found in the generation of chlorine gas in contact with the stock in the boiler, tending to rapidly disintegrate the stock by the additional action of the chlorine upon it. By this method of preparing the liquor and applying the same to the stock to be treated, I find I can reduce stock to a pulpy condition in from four to six hours by using a weak solution of caustic alkali, and thus produce a stock capable of making a soft and strong article of white paper. The benefits of this process are, first, the cheapness of the same, and second, the improved quality of stock produced thereby. I sometimes mix the soda ash, lime, and water together in the proportions above described, then mix by themselves the common salt and sulphuric acid and water, and boil them together before mixing them with the solution of soda ash and lime. But by so doing, the chlorine gas escapes to a considerable extent without acting upon the stock, and I think some of the active power of my process is thereby lost. If it is thought desirable, the solution of soda ash, lime, and water may be mixed with the straw or other stock in a separate vessel, and the salt may be dissolved and mixed with the same, so as to come in contact with the stock to be treated, and then the diluted sulphuric acid be mixed therewith, as above described, so that the proper chemical action shall have taken place before the same is introduced into the boiler. The object of this latter method is to prevent the action of the chlorine gas upon the boiler, if that should be thought to be objectionable or injurious to the boiler. After the boiler is properly charged according to either of the above methods, I then close the same, and proceed to boil in the usual method at any temperature indicated by a pressure of forty pounds or upwards to the square inch, for a period of from three to five hours.

Having thus fully described my improved process for treating straw or other fibrous substances preparatory to the manufacture of paper therefrom, what I claim as my improvement in this respect, and desire to secure by Letters Patent, is—

1. The composition and manner of constituting my boiling-liquor, in the manner and for the purpose hereinbefore substantially set forth and described.

2. I claim the manner of applying a boiling liquor to the stock by first producing the vacuum, in the manner and for the purpose as is hereinbefore described.

3. I claim the combination of my improved liquor, with the manner of applying the same by the production, first, of a vacuum, substantially in the manner and for the purpose above described.

HARRISON B. MEECH.

Witnesses:
   JOEL TIFFANY,
   ASAHEL WING.